United States Patent [19]

Gleason, Jr. et al.

[11] Patent Number: 4,789,127

[45] Date of Patent: Dec. 6, 1988

[54] HOLD DOWN MECHANISM FOR A PIVOTABLY MOUNTED MOTOR

[75] Inventors: John T. Gleason, Jr., Rochester Hills, Mich.; James Frost, Jr., Walbridge, Ohio

[73] Assignee: The DeVilbiss Company, Toledo, Ohio

[21] Appl. No.: 128,258

[22] Filed: Dec. 3, 1987

[51] Int. Cl.[4] ............................................. F16M 3/00
[52] U.S. Cl. .................................. 248/666; 248/500
[58] Field of Search ............... 248/666, 500, 121, 274, 248/284, 658, 664, 291, 292.1, 506, 637

[56] References Cited

U.S. PATENT DOCUMENTS

| | | |
|---|---|---|
| 1,324,029 | 12/1919 | Bouche . |
| 1,616,027 | 2/1927 | Cheshire .................. 248/666 X |
| 1,894,904 | 1/1933 | De Rabot .................. 248/658 X |
| 1,942,834 | 1/1934 | Railley . |
| 1,960,506 | 5/1934 | Pfleger ..................... 248/666 X |
| 2,047,838 | 7/1936 | Smith et al. ............... 248/637 X |
| 2,367,601 | 1/1945 | Nicol . |
| 2,395,625 | 2/1946 | Heyer ....................... 248/666 X |
| 2,559,980 | 7/1951 | McAllister . |
| 2,911,700 | 11/1959 | Wieland . |
| 2,925,740 | 2/1960 | Chung ...................... 248/666 X |
| 2,976,745 | 3/1961 | Bade ........................ 248/666 X |
| 3,125,211 | 3/1964 | Macy ....................... 248/666 X |
| 3,354,736 | 11/1967 | Simi ......................... 248/666 X |
| 4,242,055 | 12/1980 | Felter . |
| 4,518,373 | 5/1985 | Roth . |
| 4,768,930 | 9/1988 | Grime et al. ............... 417/362 |

FOREIGN PATENT DOCUMENTS 2070727 9/1981 United Kingdom ................ 248/666

*Primary Examiner*—Ramon O. Ramirez
*Attorney, Agent, or Firm*—MacMillan, Sobanski & Todd

[57] ABSTRACT

An improved hold down mechanism for a motor which is pivotably mounted on an upper surface of a base is disclosed. The motor is connected by means of a drive belt to a driven device also mounted on the base. A mounting bracket is rigidly attached to the motor and includes a pair of spaced apart parallel leg portions which extend outwardly therefrom. The base includes a corresponding pair of spaced apart parallel mounting ears. A pivot pin is provided for pivotably connecting the leg portions to the mounting ears. The leg portions have respective projections formed thereon which extend inwardly toward one another. A hold down plate extends between the leg portions and rests upon the projections. The hold down plate is not rigidly attached to the leg portions, and a small amount of free movement is permitted relative thereto. An angled stud is provided to restrict the pivoting movement of the hold down plate and, therefore, of the mounting bracket and the motor. The stud includes a first end which extends through an aperture formed through the hold down plate. An elastomeric damper and a washer are retained on the first end of the stud by a wing nut. The stud further includes a second end which is angled relative to the first end. The second end of the stud is hooked beneath the upper surface of the base so as to limit the movement thereof and thus restrict the pivoting movement of the motor toward the compressor. The elastomeric damper permits a preloading force to be applied on the drive belt and reduces the amount of vibration and noise transmitted from the motor to the base.

13 Claims, 2 Drawing Sheets

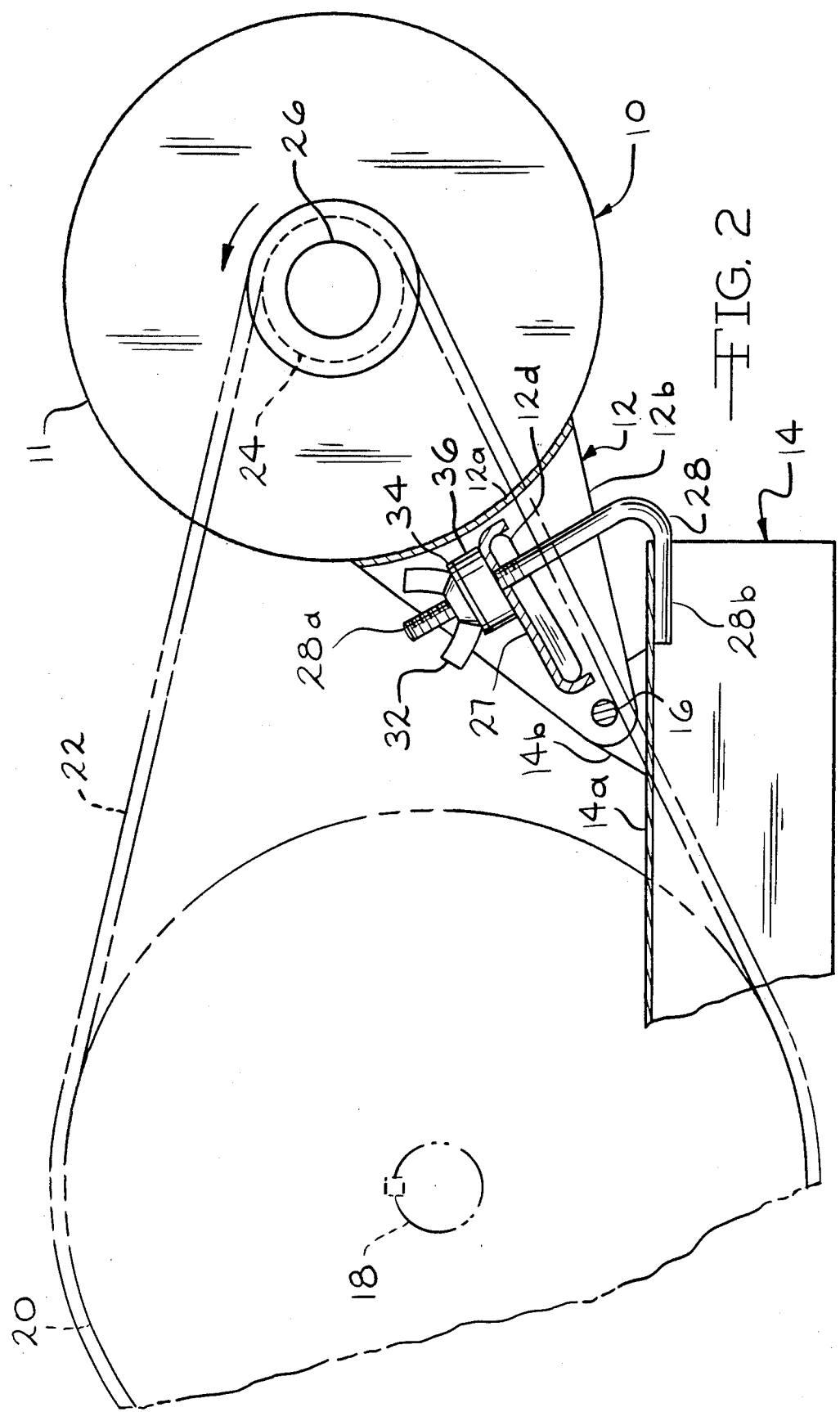

HOLD DOWN MECHANISM FOR A PIVOTABLY MOUNTED MOTOR

BACKGROUND OF THE INVENTION

The present invention relates in general to pivotable mounting structures and in particular to a hold down mechanism for a motor which is pivotably mounted on a base.

Portable and stationary air compressors are utilized to supply pressurized air to many different types of devices, including pressure feed tanks, spray guns, air brushes, caulking guns, sand blasters, pneumatic tools, tire inflaters, and the like. Air compressors for such devices generally include a hollow cylindrical air receiving tank, a compressor, and a motor. The motor is connected by a drive belt to the compressor which, when operated by the motor, supplies pressurized air to the tank. In prior air compressors, a mounting platform is welded or otherwise secured to the upper side of the air receiving tank. The compressor and the motor are mounted on the platform, with the drive belt interconnecting respective pulleys on both the motor and the compressor. The motor is mounted on the platform by means of bolts which extend through slots formed through the platform. The slots permit the position of the motor to be adjusted relative to the platform and the compressor so as to vary the tension on the drive belt.

In more recent air compressors, the motor is attached to a bracket which is pivotably secured to the mounting platform. As a result, pivotal movement of the motor is permitted toward and away from the compressor. A ratchet mechanism is provided to restrict the amount of pivotal movement of the motor toward the compressor, while allowing such pivotal movement away from the compressor. Therefore, the ratchet mechanism can be utilized to maintain a predetermined minimum tension on the drive belt.

SUMMARY OF THE INVENTION

The present invention relates to an improved hold down mechanism for a motor which is pivotably mounted on an upper surface of a base. The motor is connected by means of a drive belt to a driven device, such as a compressor, which is also mounted on the base. The hold down mechanism includes a mounting bracket which is rigidly attached to the motor. The mounting bracket includes a pair of spaced apart parallel leg portions which extend outwardly from the motor. The base is provided with a corresponding pair of upstanding spaced apart parallel mounting ears. Means are provided for pivotably connecting the leg portions of the mounting bracket to the mounting ears of the base. Each of the leg portions further includes a projection formed thereon. The projections extend inwardly toward one another. A hold down plate extends between the leg portions and rests upon the projections. The hold down plate is not rigidly attached to the leg portions, and a small amount of free movement is permitted relative thereto. However, by extending between the two leg portions, the hold down plate provides stiffness to the hold down mechanism which resists damage caused by impact loads.

An angled stud is provided to restrict the pivoting movement of the hold down plate and, therefore, of the mounting bracket and the motor. The stud includes a first end which extends through an aperture formed through the hold down plate. An elastomeric damper and a washer are retained on the first end of the stud by a wing nut. The stud further includes a second end which is angled relative to the first end. The second end of the stud is hooked beneath the upper surface of the base so as to limit the movement thereof and thus restrict the pivoting movement of the motor toward the compressor. The elastomeric damper permits a preloading force to be applied on the drive belt. The elastomeric damper also reduces the amount of vibration and noise transmitted from the motor to the base.

It is an object of the present invention to provide an improved hold down mechanism for a motor which is pivotably mounted on a base.

It is another object of the present invention to provide such a hold down mechanism which reduces the amount of vibration and noise transmitted from the motor to the base.

It is a further object of the present invention to provide such a hold down mechanism which provides a measure of stiffness in order to resist damage caused by impact loads applied thereto, yet which is not rigidly attached to the base in order to allow for freedom of movement during operation.

Other objects and advantages of the present invention will become apparent to those skilled in the art from the following detailed description of the preferred embodiment, when read in light of the accompanying drawings.

BRIEF DESCRIPTION OF THE DRAWINGS

FIG. 2 is a sectional elevational view of one side of the hold down mechanism illustrated in FIG. 1.

DETAILED DESCRIPTION OF THE PREFERRED EMBODIMENT

Figure 1:
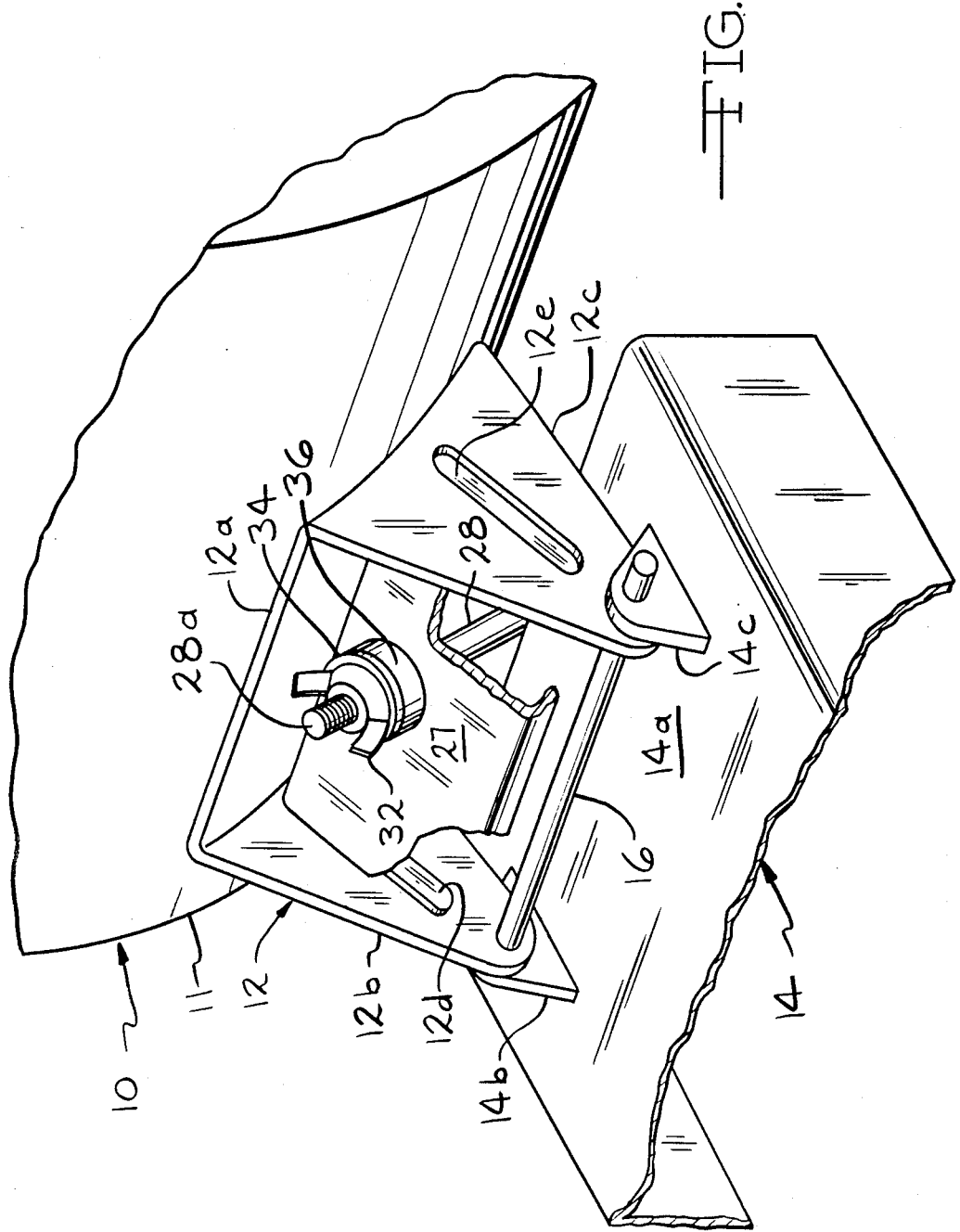
FIG. 1 is a perspective view, partially broken away, of an improved hold down mechanism in accordance with the present invention.

Referring now to the drawings, there is illustrated in FIGS. 1 and 2 a motor or other driving device, indicated generally at 10, disposed within a cylindrical outer casing 11. A mounting bracket, indicated generally at 12, is provided having a U-shaped configuration. The mounting bracket 12 includes a central portion 12a which is rigidly attached to the outer casing 11 of the motor 10 by any conventional means, such as by welding. The central portion 12a may be curved to conform to the outer surface of the casing 11 when attached thereto. The mounting bracket 12 further includes first and second leg portions 12b and 12c, which are formed integrally with the opposed sides of the central portion 12a. The leg portions 12b and 12c are generally triangular in shape, the bases of the triangles being formed integrally with the central portion 12a. The leg portions 12b and 12c extend outwardly away from the outer casing 11 of the motor 10 in spaced apart parallel fashion. An aperture is formed through each of the leg portions 12b and 12c of the mounting bracket 12 near the outermost end thereof. The apertures are aligned with each other to as to define an axis therethrough.

One face of the first leg portion 12b is provided with an integral projection 12d. The projection 12d is elongated in shape and extends generally radially outwardly from the motor 10 along the face of the first leg portion 12b. The ends of the projection 12d may be curved to provide a smooth rounded surface. The projection 12d may be formed integrally with the first leg portion 12b or may be formed as a separate member rigidly attached thereto, such as by welding. One face of the second leg portion 12c is provided with a similar projection 12e. The projections 12d and 12e are aligned and extend toward one another.

A base, indicated generally at 14, having a flat upper surface 14a is provided for supporting the motor 10 thereon. A pair of mounting ears 14b and 14c are attached to or are formed integrally with the flat upper surface 14a in spaced apart parallel fashion. Respective apertures are formed through the mounting ears 14b and 14c. The apertures are aligned with one another so as to define an axis therethrough. The mounting bracket 12 (as well as the motor 10 attached thereto) is pivotally mounted on the base 14 by aligning the apertures formed through the leg portions 12b and 12c with the apertures formed through the mounting ears 14b and 14c, thereby orienting the respective axes co-axially. Once so aligned, a pivot pin 16 is inserted through all of the apertures. The pivot pin 16 permits the mounting bracket 12, together with the motor 10 attached thereto, to pivot relative to the base 14 about the co-axial axes defined by the apertures.

As suggested in FIG. 2, the base 14 may also be utilized to support a device adapted to be driven by the motor 10, such as, for example, an air compressor (not shown). The driven device typically includes a rotatable input shaft 18 which is connected for rotation with a driven pulley 20. The driven pulley 20 is connected by a drive belt 22 to a driving pulley 24. The driving pulley 24 is connected for rotation with a rotatable output shaft 26 of the motor 10. Thus, a driving connection is provided between the motor 10 and the driven device.

A hold down plate 27 is provided to restrict the amount by which the motor 10 may pivot relative to the base 14 and to the driven device. The hold down plate 27 is generally flat and extends between the leg portions 12b and 12c of the mounting bracket 12. The hold down plate 27 rests upon the projections 12d and 12e, but is not attached or otherwise secured to the projections 12d and 12e or to the leg portions 12b and 12c. The width of the hold down plate 27 is slightly less than the distance separating the leg portions 12b and 12c from one another. Thus, a relatively small amount of clearance is maintained between the sides of the hold down plate 27 and the leg portions 12b and 12c. However, the edges of the hold down plate 27 which extend over the ends of the projections 12d and 12e may be curved so as to extend around a portion of such ends, as best shown in FIG. 2. By curving the ends of the hold down plate 27 in this manner, the hold down plate 27 is prevented from accidentally sliding off the projections 12d and 12e, regardless of the angular orientation of the mounting bracket 12.

An aperture is formed through a central portion of the hold down plate 27. A stud 28 is provided having a first end 28a which extends through such aperture. A wing nut 32, an annular washer 34, and an annular elastomeric damper 36 are all disposed about the first end 28a of the stud 28. The elastomeric damper 36 is disposed adjacent to the hold down plate 27, while the washer 34 is disposed between the elastomeric damper 36 and the wing nut 32. The terminal portion of the first end 28a of the stud 28 is threaded to permit the wing nut 32 to be threaded thereon. Thus, the wing nut 32 retains the the washer 34 and the elastomeric damper 36 on the first end 28a of the stud 28. The stud 28 further includes a second end 28b which is opposite to the first end 28a.

The second end 28b extends below the aperture formed through the hold down plate 27 and is angled relative to the first end 28a so as to permit it to be hooked beneath the flat upper surface 14a of the base 14, as shown in FIG. 2.

The wing nut 32 may be rotated relative to the first end 28a of the stud 28. As a result of such rotation, the wing nut 32 is moved axially upwardly and downwardly on the first end 28a of the stud 28. By rotating the wing nut 32 to a desired axial position on the stud 8, the wing nut 32 may be utilized to define a positive stop for limiting the pivoting movement of the motor 10 and the mounting bracket 12 toward the driven device. This occurs because the upward movement of the angled second end 28b of the stud 28 is limited by its engagement of the upper surface 14a of the base 14. Consequently, the axial distance separating the wing nut 32 from the angled second end 28b defines a predetermined angular position which limits the pivoting movement of the motor 10 toward the driven device (counterclockwise in FIG. 2). Accordingly, the tension on the drive belt 22 may be maintained at or above a predetermined level. Also, the positive stopping action provided by the wing nut 32 functions as a safety device to prevent the motor 10 from moving toward the driven device if the combined motor 10 and base 14 assembly is attempted to be lifted by grasping and raising the motor 10. Thus, the engagement of the hold down plate 27 with the elastomeric damper 36 and the wing nut 32 prevents the motor 10 from pivoting unexpectedly relative to the base 14.

The elastomeric damper 36 may be formed from nitrile rubber and have a hardness in the range of from 75 to 85 on the Shore A Durometer scale. Therefore, the elastomeric damper 36 is compressible, but only to a relatively small extent in the contemplated environment. Because of such compression, however, the elastomeric damper 36 permits a spring-like preloading tension to be established on the belt 22. The spring-like action permits the motor 10 to move toward and away from the driven device by relatively small distances while still maintaining a relatively constant amount of tension on the drive belt 22. However, the elastomeric damper 36 is sufficiently hard as to prevent the motor 10 from pivoting closer to the driven device than the predetermined angular position. Thus, the elastomeric damper 36 permits the predetermined angular position to be well defined, while still providing the desirable spring-like action for maintaining the tension in the drive belt 22.

Additionally, the elastomeric damper 36 is capable of absorbing relatively small variations in the loads placed on the motor 10 during use in order to maintain a relatively constant tension on the belt 22. Although it is capable of being compressed only to a relatively small extent, the elastomeric damper 36 is capable of absorbing a significant amount of the vibration and noise generated by the motor 10. Consequently, the amount of such vibration and noise which would otherwise be transmitted to the base 14 is greatly reduced.

The operation of the present invention can best be understood with reference to FIG. 2. As shown therein, the motor 10 is pivotably mounted on the base 14 and oriented such that the weight thereof tends to pivot the motor 10 and the mounting bracket 12 away from the driven device (clockwise in FIG. 2). The hold down mechanism is installed by initially disposing the hold down plate 27 on the projections 12d and 12e as shown and inserting the first end 28a of the stud 28 upwardly through the hold down plate aperture. Next, the elastomeric damper 36 and the washer 34 are disposed about the first end 28a of the stud 28 above the hold down plate 27, and the wing nut 32 is rotatably secured to the terminal portion of the first end 28a. Initially, the wing nut 32 is only rotated onto the first end 28a of the stud 28 by a relatively small amount initially, enough to retain it thereon.

Because the wing nut 32 has only been rotated onto the first end 28a of the stud 28 by only a relatively small amount, the second end 28b of the stud 28 hangs loosely below the upper surface 14a of the base. In order to raise the second end 28b upwardly into engagement with the upper surface 14a, the wing nut 32 is further rotated about the first end 28a of the stud 28. Such rotation draws the stud 28 upwardly through the hold down plate aperture. The second end 28b of the stud 28 is manually oriented during this rotation of the wing nut 32 so as to be hooked below the upper surface 14a as described above. The wing nut 32 is snugly tightened by hand until the elastomeric damper 36 is then slightly compressed between the washer 34 and the hold down plate 27. Such compression also tends to urge the motor 10 to pivot away from the driven device.

Thus, a predetermined amount of pre-loading tension is created in the drive belt 22 by virtue of such compression and because of the weight of the motor 10. As a result, a driving connection is created between the motor 10 and the driven device. When the motor 10 is energized for use, the driving pulley 24 and the output shaft 26 will rotate in the direction indicated by the arrow (counter-clockwise) in FIG. 2. Such rotation will tend to pivot the motor 10 away from the driven device (clockwise in FIG. 2). During use, the angular disposition of the motor 10 relative to the base 14 will vary accordingly to several factors, including the weight of the motor 10, the speed at which the motor 10 is operated, the amount of the load which is placed on the motor 10, and the like. Generally, however, it is desirable to restrict the pivoting movement of the motor 10 such that it cannot pivot closer toward the driven device than the predetermined angular position. If the motor 10 is permitted to pivot closer than this predetermined angular position, the tension in the drive belt may decrease to the point where the driving connection will be lost.

If the motor 10 is pivoted away from the driven device (clockwise in FIG. 2) to greater than the predetermined angular position, the stud 28 will hang loosely on the hold down plate 27 by means of the wing nut 32. In this position, the angled second end 28b of the stud 28 will move downwardly out of engagement with the upper surface 14a of the base 14. When the motor 10 is subsequently pivoted toward the drive device (counter-clockwise in FIG. 2), the hold down plate 27 and the stud 28 carried thereon will rise upwardly. When the predetermined angular position is reached, the angled second end 28b of the stud 28 will engage the bottom of the upper surface 14a of the base. Further pivoting movement of the motor 10 toward the driven device will be prohibited. This engagement therefore defines the predetermined angular position described above, beyond which it would be undesirable to permit the motor 10 to pivot toward the driven device.

As mentioned above, the hold down plate 27 extends between the two leg portions 12b and 12c of the mounting bracket 12. As a result, the hold down plate 27 reinforces the stiffness of the mounting bracket 12, while permitting a limited amount of free movement. Generally during use, the leg portions 12b and 12c flex by a relatively small amount relative to the central portion 12a. Such flexing action is desirable because it tends to absorb vibration and noise created by the motor 10. Thus, the small amount of clearance is provided between the ends of the hold down plate 27 and the leg portions 12b and 12c to permit this to occur. However, if an impact load is applied to the motor 10, such as might occur if the motor 10 and the base 14 were dropped, the hold down plate 27 prevents the leg portions 12b and 12c from being deformed by this excessive and unusual force. In such a situation, the edges of the hold down plate 27 would engage the leg portions 12b and 12c after they have been deflected by the amount of the clearance. As a result of such engagement, the leg portions 12b and 12c would be generally maintained in their desired spaced apart parallel positions. This reinforcement strengthens the mounting bracket 12 and decreases the likelihood of damage occurring to the mounting bracket 12.

Even though the hold down mechanism of the present invention provides for reinforcement of the mounting bracket 12 in this manner, the hold down plate 27 is not physically secured or attached to the mounting bracket 12. Similarly, the stud 28 is not physically secured or attached to the base 14. As a result, a certain amount of freedom of movement is permitted in the hold down mechanism as the motor 10 is operated. Thus, the components of the structure are protected from being damaged during operation relatively small movements thereof. Additionally, the costs of manufacturing and assembling the structure are reduced. As an additional benefit, the hold down plate 27 of the present invention causes the load applied to the projections 12d and 12e (and therefore to the leg portions 12b and 12c) upon engagement of the angled second end 28b to be applied equally to the leg portions 12b and 12c. Such equal loading tends to prevent misalignment from occurring between the driving pulley 20 and the driven pulley 24.

In accordance with the provisions of the patent statutes, the principle and mode of operation of the present invention have been explained and illustrated in its preferred embodiment. However, it must be understood that the present invention may be practiced otherwise than as specifically explained and illustrated without departing from its spirit or scope.

What is claimed is:

1. A hold down mechanism for pivotably supporting a device on a base comprising:
   a mounting bracket having at least one leg portion extending therefrom, said leg portion including a projection;
   at least one mounting ear formed on the base;
   means for pivotably connecting said leg portion to said mounting ear;
   hold down plate means disposed on said projection; and
   means extending between said hold down plate means and the base for restricting the pivoting movement of the device beyond a predetermined angular position.

2. The invention defined in claim 1 wherein said means for restricting the pivoting movement of the device includes stud means extending between said hold down plate means and said base.

3. The invention defined in claim 2 wherein said stud means includes a first end extending through an aperture formed in said hold down plate means and and a second end adapted to engage said base.

4. The invention defined in claim 3 wherein said means for restricting the pivoting movement of the device further includes stop means secured to said first end of said stud means for restricting the pivoting movement of the device beyond a predetermined angular position.

5. The invention defined in claim 4 further including an elastomeric damper disposed on said stud means between said hold down plate and said stop means.

6. The invention defined in claim 5 further including a washer disposed on said stud means between said elastomeric damper and said stop means.

7. The invention defined in claim 4 wherein said stop means includes a wing nut threaded onto a threaded portion of said first end of said stud means.

8. A hold down mechanism for pivotably supporting a device on a base comprising:
 a mounting bracket having a pair of leg portions extending therefrom, each of said leg portions having a projection formed thereon, said projections being aligned with one another and extending toward one another;
 a pair of mounting ears formed on the base;
 means for pivotably connecting said leg portions to said mounting ears;
 a hold down plate disposed on said projections and extending between said leg portions, a relatively small clearance being maintained between opposed edges of said hold down plate and said leg portions, said hold down plate having an aperture formed therethrough;
 stud means having a first end extending through said aperture formed in said hold down plate and a second end adapted to engage the base; and
 stop means secured to said first end of said stud means for restricting the pivoting movement of the device beyond a predetermined angular position.

9. The invention defined in claim 8 further including an elastomeric damper disposed on said stud means between said hold down plate and said stop means.

10. The invention defined in claim 9 further including a washer disposed on said stud means between said elastomeric damper and said stop means.

11. The invention defined in claim 8 wherein said stop means includes a wing nut threaded onto a threaded portion of said first end of said stud means.

12. The invention defined in claim 9 wherein said elastomeric damper is formed from nitrile rubber.

13. The invention defined in claim 9 wherein said elastomeric damper has a hardness in the range of from 75 to 85 on the Shore A Durometer scale.

* * * * *